(12) United States Patent
Kim

(10) Patent No.: US 11,385,938 B2
(45) Date of Patent: Jul. 12, 2022

(54) CLOUD PLATFORM SYSTEM

(71) Applicants: NAMU TECH CO., LTD., Seongnam-si (KR); ACORNSOFT CO., LTD., Seoul (KR)

(72) Inventor: In Seok Kim, Goyang-si (KR)

(73) Assignees: NAMU TECH CO., LTD., Seongnam-si (KR); ACORNSOFT CO., Seoul (KR)

( * ) Notice: Subject to any disclaimer, the term of this patent is extended or adjusted under 35 U.S.C. 154(b) by 228 days.

(21) Appl. No.: 16/606,942

(22) PCT Filed: Apr. 30, 2018

(86) PCT No.: PCT/KR2018/004991
§ 371 (c)(1),
(2) Date: Oct. 21, 2019

(87) PCT Pub. No.: WO2018/203634
PCT Pub. Date: Nov. 8, 2018

(65) Prior Publication Data
US 2020/0218580 A1 Jul. 9, 2020

(30) Foreign Application Priority Data

May 2, 2017 (KR) .................. 10-2017-0056478

(51) Int. Cl.
*G06F 9/50* (2006.01)
*G06F 9/455* (2018.01)
*G06F 9/54* (2006.01)
*H04L 43/0817* (2022.01)
*H04L 43/16* (2022.01)
*H04L 67/1001* (2022.01)
(Continued)

(52) U.S. Cl.
CPC ........ *G06F 9/5072* (2013.01); *G06F 9/45558* (2013.01); *G06F 9/5077* (2013.01); *G06F 9/547* (2013.01); *H04L 43/0817* (2013.01); *H04L 43/16* (2013.01); *H04L 67/1002* (2013.01); *H04L 67/1095* (2013.01); *H04L 67/16* (2013.01); *H04L 67/34* (2013.01); *G06F 2009/4557* (2013.01); *G06F 2009/45591* (2013.01)

(58) Field of Classification Search
CPC .. G06F 9/5072; G06F 9/45558; G06F 9/5077; G06F 9/547; H04L 43/0817; H04L 43/16; H04L 67/1002; H04L 67/1095; H04L 67/16; H04L 67/34
USPC ......................................................... 709/226
See application file for complete search history.

(56) References Cited

U.S. PATENT DOCUMENTS

| 9,621,853 | B1 | 4/2017 | Yang et al. | |
|---|---|---|---|---|
| 2016/0162320 | A1* | 6/2016 | Singh .................. | G06F 9/5005 718/1 |
| 2017/0257432 | A1 | 9/2017 | Fu et al. | |

FOREIGN PATENT DOCUMENTS

| KR | 10-2015-0054496 A | 5/2015 |
|---|---|---|
| KR | 10-2016-0000604 A | 1/2016 |
| KR | 10-2017-0085072 A | 7/2017 |

* cited by examiner

*Primary Examiner* — Wing F Chan
*Assistant Examiner* — Leon Y Tseng
(74) *Attorney, Agent, or Firm* — Novick, Kim & Lee, PLLC; Jae Youn Kim

(57) ABSTRACT

A cloud platform system is configured to ensure the availability and extendibility of application services, enable multi/hybrid cloud integration management, and construct, operate, and manage an enterprise cloud enabling efficient development and operation.

28 Claims, 12 Drawing Sheets

(51) Int. Cl.
*H04L 67/1095* (2022.01)
*H04L 67/51* (2022.01)
*H04L 67/00* (2022.01)

CLOUD PLATFORM SYSTEM

CROSS-REFERENCE TO RELATED APPLICATIONS

This application is a national stage entry under 35 USC 371 of PCT/KR2018/004991, filed Apr. 30, 2018, which claims priority to KR 10-2017-0056478, filed May 2, 2017, the disclosure of which is incorporated by reference herein in its entirety.

STATEMENT REGARDING PRIOR DISCLOSURES BY THE INVENTOR

It is advised that the claimed invention was disclosed at Namu Tech Cloud Innovation Summit, on Apr. 20, 2017, in a presentation entitled "Build Your Own Cloud" by the inventor or another who obtained the subject matter disclosed directly or indirectly from the inventor under 35 USC 102(b)(1).

TECHNICAL FIELD

The present invention relates to a cloud platform system, and more particularly, to a cloud platform system for ensuring the availability and extendibility of application services, enabling multi/hybrid cloud integration management, and constructing, operating, and managing an enterprise cloud enabling efficient development and operation.

BACKGROUND ART

A cloud is referred to as a 'server of a service provider' depending on the practices that represent a computing service provider server in a cloud shape. Only when the cloud stores software and data in a central computer connected to the Internet to access the Internet, the data may be used anytime and anywhere.

The cloud may be divided into Software as a Service (SaaS) which is an application service provided to multiple users with on-demand, such as 'Salesforce.com' and 'Google e-mail', Platform as a Service (PaaS) which is a software stack required for execution of developing platforms or applications such as AWS ("Amazon Web Service") RDS ("Relational Database Service"), Google App Engine (note, Google App Engine is a cloud computing platform as a service for developing and hosting web applications), and Infrastructure as a Service (IaaS) providing a server or storage to a user in a service form such as Amazon EC2 ("Elastic Compute Cloud"), according to a service providing form.

In addition, the cloud may be divided into a private cloud operated only for a group, a public cloud rendered through an open network for public use, and a hybrid cloud as a combination of two or more clouds which has distinct identities, but are tired together, according to introducing and deploying forms.

Meanwhile, in the enterprise cloud, it is more important to customize and optimize the technology and infrastructure based on an application service with a cloud implementing business and IT strategy of a company.

However, in the case of the application service, it is difficult to guarantee the availability and extendibility with only an existing cloud infrastructure. Therefore, there is a need to optimize cloud construction and operation according to the characteristics of an application.

In addition, selection of cloud infrastructure and technology should be flexible according to a need of the application service, and the selection is required to build a multi/hybrid cloud rather than a single cloud by considering graded introduction, security, and technology costs. To this end, it is important to integrate and manage the multi/hybrid cloud to overcome the complexity and heterogeneity.

In addition, recently, a prompt response to fast and various changes of market and customer's demands has become important, and thus features such as automation (API, or "Application Programing Interface") and self-services in the cloud providing foundations for the efficient development/ operation become necessary. Through the methodology and technical application suitable for application services and business, there is a need for improvement and extension of the existing scheme of cloud construction, configuration, and management.

DISCLOSURE

Technical Problem

Therefore, in order to solve the problems, an object to the present invention is to provide a cloud platform system for ensuring the availability and extendibility of application services, enabling multi/hybrid cloud integration management, and constructing, operating, and managing an enterprise cloud enabling efficient development and operation.

However, technical objects of the present disclosure are not restricted to the technical object mentioned as above. Unmentioned technical objects will be readily appreciated by those skilled in the art by referencing the following description.

Technical Solution

According to an embodiment of the present invention, there is provided a cloud platform system comprising, a cloud integration unit which automatically configures an infrastructure of a multi/hybrid cloud to provide the configured infrastructure to an application and synchronize configuration information for management, a service management unit which serves to assign and manage a cloud account and a user network resource to a logical group that manages an application cluster, an application orchestration unit which deploys the application based on a container image, automatically provides an infrastructure of the cloud when the application is deployed, replicates the application into multiple application instances, wherein the replicated application is serviced through load balancing, performs an update job such as deployment and infrastructure change without stopping the load balancing, performs a rolling update configuring automation when there are dependencies between the multiple application instances, in/out scaling of an instance of the multiple application instances through the monitoring of the application and up/down scaling of a resource capacity in the case of the application infrastructure, and configures scaling automation through monitoring information, and a development/operation unit (i.e., "DevOps View") that is used for checking and displaying service status, cluster map, monitoring, resource management, metering, job management, and all other enterprise status management/analysis functions. The development/ operation unit is hereinafter abbreviated as DevOps.

The cloud integration unit may perform a cloud provisioning function of configuring and providing a network infrastructure of the cloud to a cluster of the multiple application instances and configuring and providing a computing infrastructure of the cloud to the multiple application instances, and provide a cluster configuration tool in the case of that the computing infrastructure is merely a physical computer hardware infrastructure (i.e., "Bare Metal").

The cloud integration unit may store and manage configuration information of the infrastructure of the cloud in an integral configuration database ("DB" hereinafter) and synchronize infrastructure change information with the integral configuration DB when the cloud is operating.

The service management unit may, as a typical cloud provider would normally do, perform an integrated account management function that integrally manage a multi-cloud account and access information, and the integrated account management function is also used to provide configuration for a network and a cloud.

The service management unit may perform a user management function that manages team members, and manages the service and authority required for development/operation, wherein the authority may include enterprise service management authority (i.e., Administrator or Admin), enterprise service inquiry authority (i.e., Manager), and service management authority (i.e., DevOps) assigned to members.

The application orchestration unit may replicate the application into multiple application instances while maintaining a specified initial replication number and restart when an error occurs through an application container health check.

The application orchestration unit may perform a monitoring function of monitoring an instance of the multiple application instances and generating and managing an alarm through a threshold setting.

The service status function of the development/operation unit may provide a view that may be used to determine a status of a cluster of the multiple applications instances based on the service, wherein items of a service status, a cluster status, and a monitoring alarm may be displayed on the view.

In the service status, the entire service status of the cocktail cloud is inquired and a cloud provider, a cluster, a server, a cloud component, current month using cost, etc. may be determined by synthesizing a configuration status of the cluster in the service.

In the cluster status, a provider, a region, a server, a cloud component, and monthly usage cost of the cluster may be inquired in a card form. In the case of the physical computer hardware infrastructure (i.e., Bare Metal) cluster, the monthly usage cost may be excluded.

In the monitoring alarm item, when an alarm occurs in the multiple application instances, and/or in the infrastructure of the cluster, the cluster status may be checked in a cluster card.

The cluster map function of the development/operation unit may provide a view by visualizing and inquiring/managing a configuration and status information of the multiple application instances in a map form, wherein items such as a server of the cluster, a cloud component, and a server group may be displayed on the view.

The server item of the cluster may check application status, an application status, and a resource usage in the server, manage scaling, rolling update, etc., and may be divided into multiple instances or single instance, according to a replication function.

The cloud component item may manage PaaS ("Platform as a Service") services provided by a provider.

The server group item may manage a logical group of a server configuration.

The monitoring function of the development/operation unit may provide a monitoring view capable of checking a source capacity and a status of each of the multiple application instances and the infrastructure in the cluster, and checking a status of a cloud resource. The monitoring view may provide a view showing a usage of resources such as a CPU ("Central Process Unit"), a memory, an average of a disk, and TOP information (Note, "TOP information" refers to the "TOP" row (i.e. the first row) in the view showing a usage of resources. For example, the TOP row in the "Cost by Server" tab, and the TOP row in the "Cost by Resource" tab in FIG. 9) about an operation.

The monitoring view may include a view conversion (trend/data) item and a target conversion (server/resource). In the view conversion item, a trend view may provide monitoring information for each time for the server, each of the multiple application instances, and the application container. The data view may provide an average of the current time, and a TOP information monitoring value. In the target conversion item, a monitoring target may be changed to target at a server in the cluster and a resource of the cloud infrastructure.

The resource management function of the development/operation unit may check a resource of the cloud infrastructure that configures the application, and provide a resource management view capable of adjusting detailed settings if necessary.

The resource management view may include a resource information item and an action item. The application of the resource information item may manage container configuration and deployment information, wherein the resource information of the cloud may consist of a load balancer, an instance (e.g., which includes "instance Image", "Instance Type", "Instances", "Volume" shown in FIG. 8, and a security. An instance of the resource information may manage a capacity and a volume, and the resource information required for adjustment may be performed through the action item.

The metering function of the development/operation unit may provide a metering view capable of checking cost information of the infrastructure resource of the cloud used for the application, wherein the metering view may include a cluster infrastructure use cost item, a server, and a cost item for a resource.

The cluster infrastructure use cost item may provide a cost status of the cloud resource used by the cluster and the server, previous month and current month cost information, next month estimation cost, and a cost increase and/or decrease trend graph for each month.

Cost items for each server and each resource may provide cloud resource cost used for each server based on TOP information and may provide cost used for each cloud resource type based on TOP information.

The job management function of the development/operation unit may provide a job management view capable of scheduling and automating an operation job, such as deployment, a remote command, and resource management.

The job management view may include a job status item and a job management item. The job status item may be divided into deployment, a remote command, and a resource management task, and the item may be configured by combining respective tasks, wherein the deployment may refer to application deployment, the remote command may mean performing an OS ("Operating System") command in remote, and the resource management may mean scaling and a status/setting change, and the job management item may set a performing method according to immediately performing, scheduling, and occurrence of an alarm. The performance according to the occurrence of the alarm may be used in automatic scaling according to a reference value of the capacity monitoring. The job management item may provide an execution state and a log check of the job.

The enterprise status management/analysis function of the development/operation unit may provide a dashboard that inquires a status of each of the multiple application instances and the cloud infrastructure at the enterprise level, and provides cost/budget management, cost optimization analysis, and statistics reports.

The dashboard may include an application status item, a cloud status item, a cost/budget management item, a cost optimization analysis item, and a statistics/report item. The application status item may enterprise-widely determine and inquire application and infrastructure statuses based on standardized elements of the server, the cluster, and the cloud component, and provides a service-based status view. The cloud status item may determine a status of a cloud used for each enterprise, each provider, each region, and/or each resource, and provide an infrastructure-based status. The cost/budget management item and the cost optimization analysis items may determine an enterprise cloud cost situation and provide information enabling efficient use of cloud resource by budget assignment/control and optimized analysis for each service. The statistics/report item may provide statistical information and a report view required for analysis and reporting.

The cloud platform system may further comprise an image storage that manages registration, share, download, search, and version of the application container, a monitoring DB ("Database") that manages monitoring information of the application and the infrastructure, and an integral configuration DB that manages configuration information of a provider, a network, a service, a cluster, a server, a component, and a cloud resource.

According to another embodiment of the present invention, there is provided a cloud platform system having an architecture comprising: a cluster which is configured by a node and a master based on an orchestration, wherein the node is a structure of processing a command of the master by a worker and the worker is responsible for communication with the master and an executor is supported by an execution command; a provider plugin which is used as a basic module for integral management by a cloud provider API ("Application Programming Interface") and an API wrapper for supporting Kubernetes API (It is noted that Kubernetes is an open-source container orchestration system for automating software deployment, scaling, and management.) for a multi-cloud and a bare metal and is configured by a plugin module for provider extension; a server manager which is a control module of performing orchestration of an application container and an infrastructure in the server, and provides a replication control to restart/recover a container abnormally terminated, scaling of performing scale in/out and up/down through an instance type and a volume extension, and a rolling update function of performing non-disruptively an application container deployment sequentially; a DevOps manager, as a manager module of DevOps, which provides a configuration manager for provisioning a multi-cloud infrastructure, a metering manager for managing a usage and cost of multi-cloud resources, a resource manager for managing a resource status and settings of the multi-cloud, a monitoring manager for collecting and managing container/infrastructure monitoring information, and a job manager for a task of deployment, a server action, and a remote command in which various job tasks are combined and integrally performed and immediate performance, a performance time, and event occurrence are performance conditions; a DB/storage which is provided for managing configuration information of an application and an infrastructure, monitoring information, and an application container image; an API server which provides all functions of the cloud to the API and supports customization according to a corporate strategy and integration with other solutions; and a user console provided in a form of Web GUI ("Graphic User Interface").

Advantageous Effects

In the cloud platform system according to the present invention, it is possible to ensure the availability and extendibility of application services, enable multi/hybrid cloud integration management, and construct, operate, and manage an enterprise cloud enabling efficient development and operation.

MODES OF THE INVENTION

Figure 1:
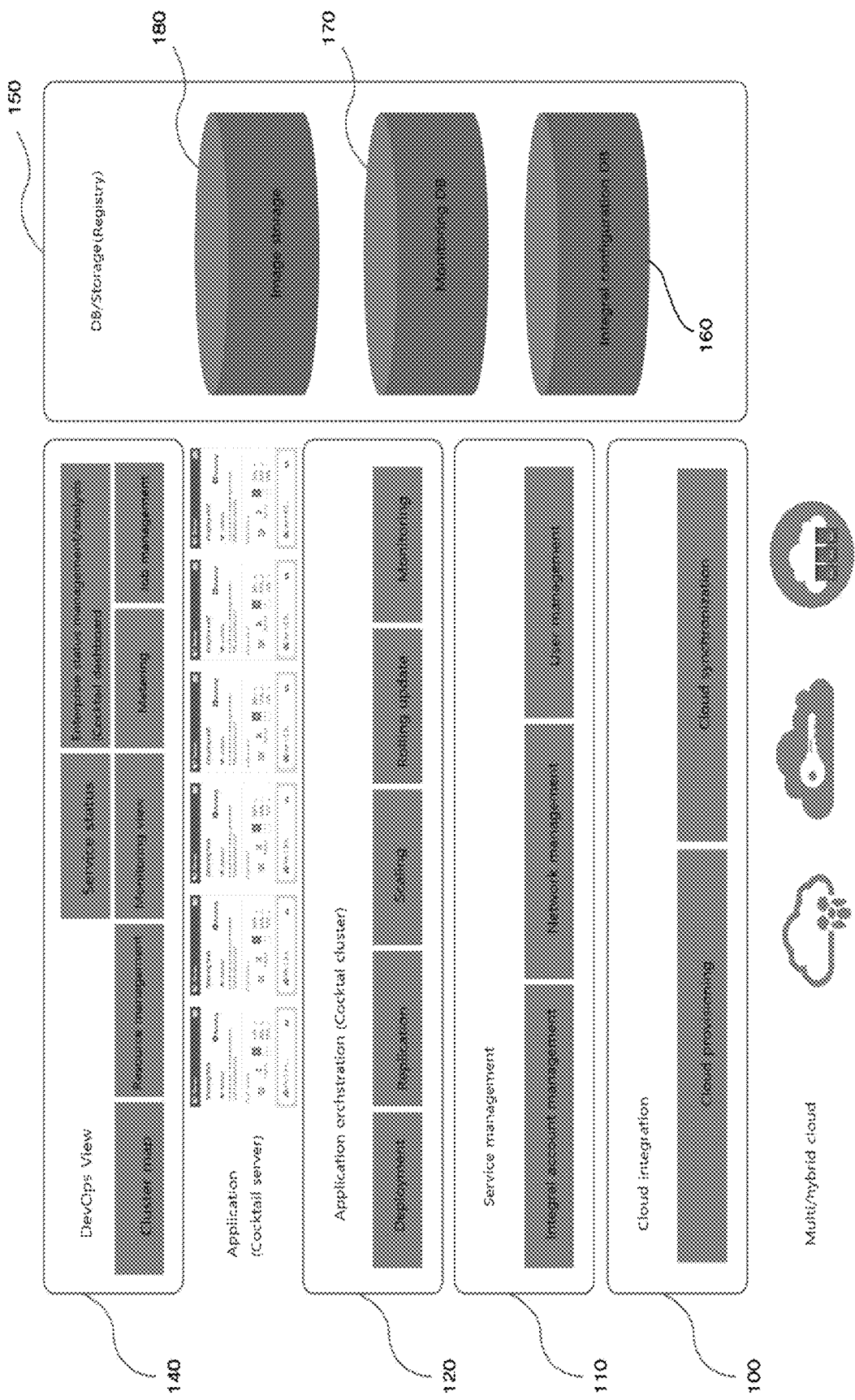
FIG. 1 illustrates a configuration diagram of a cloud platform system according to an embodiment of the present invention.

Advantages and features of the present disclosure, and methods for accomplishing the same will be more clearly understood from exemplary embodiments described in detail below with reference to the accompanying drawings. However, the present invention is not limited to the embodiments set forth below, and may be embodied in various different forms. The present embodiments are just for rendering the disclosure of the present invention complete and are set forth to provide a complete understanding of the scope of the invention to a person with ordinary skill in the technical field to which the present invention pertains, and the present invention will only be defined by the scope of the claims.

Like reference numerals refer to like elements throughout the specification.

Hereinafter, a cloud platform system according to an embodiment of the present invention will be described with reference to the accompanying drawings.

Figure 2:
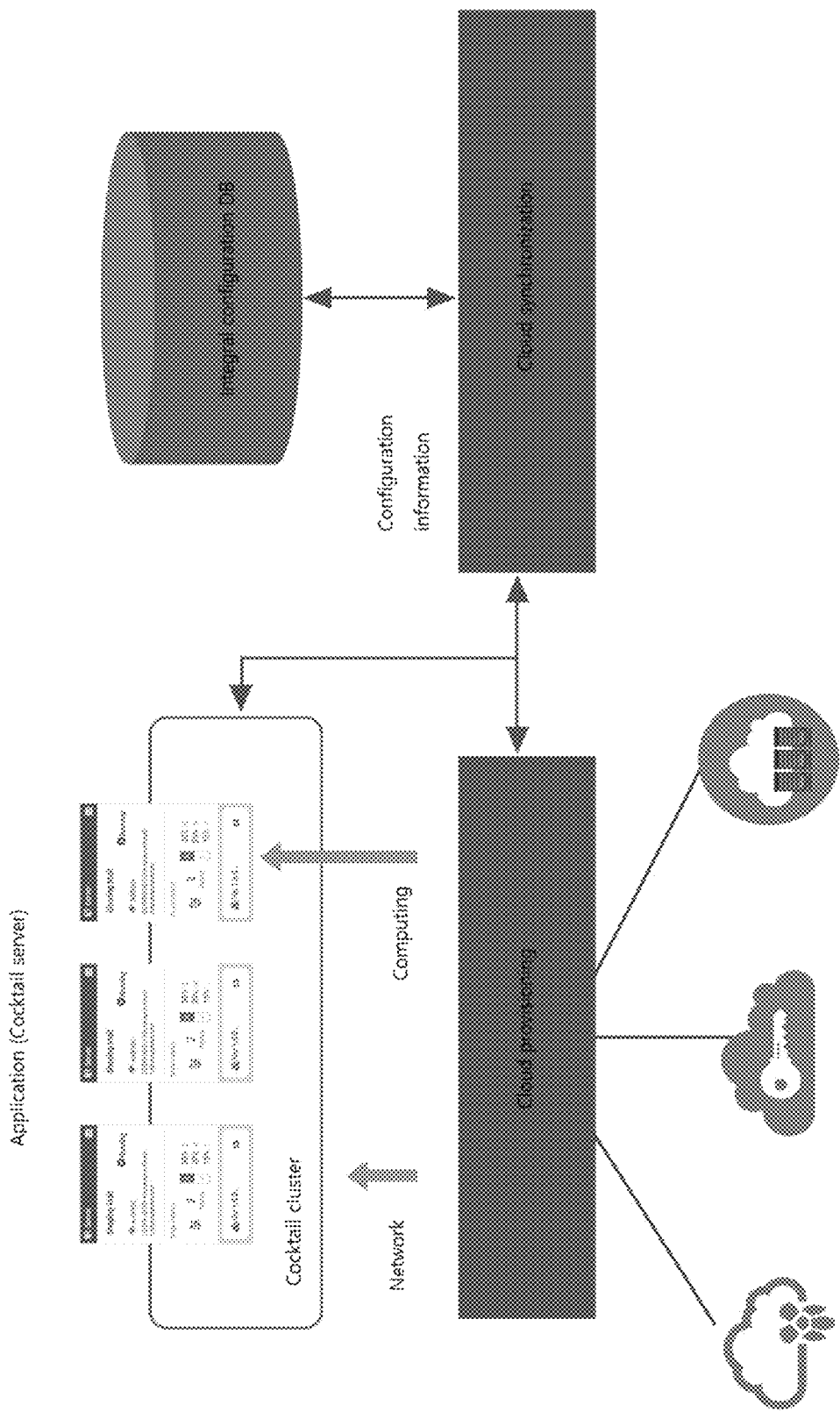
FIG. 2 illustrates briefly a function of a cloud integration unit of FIG. 1.
Figure 3:
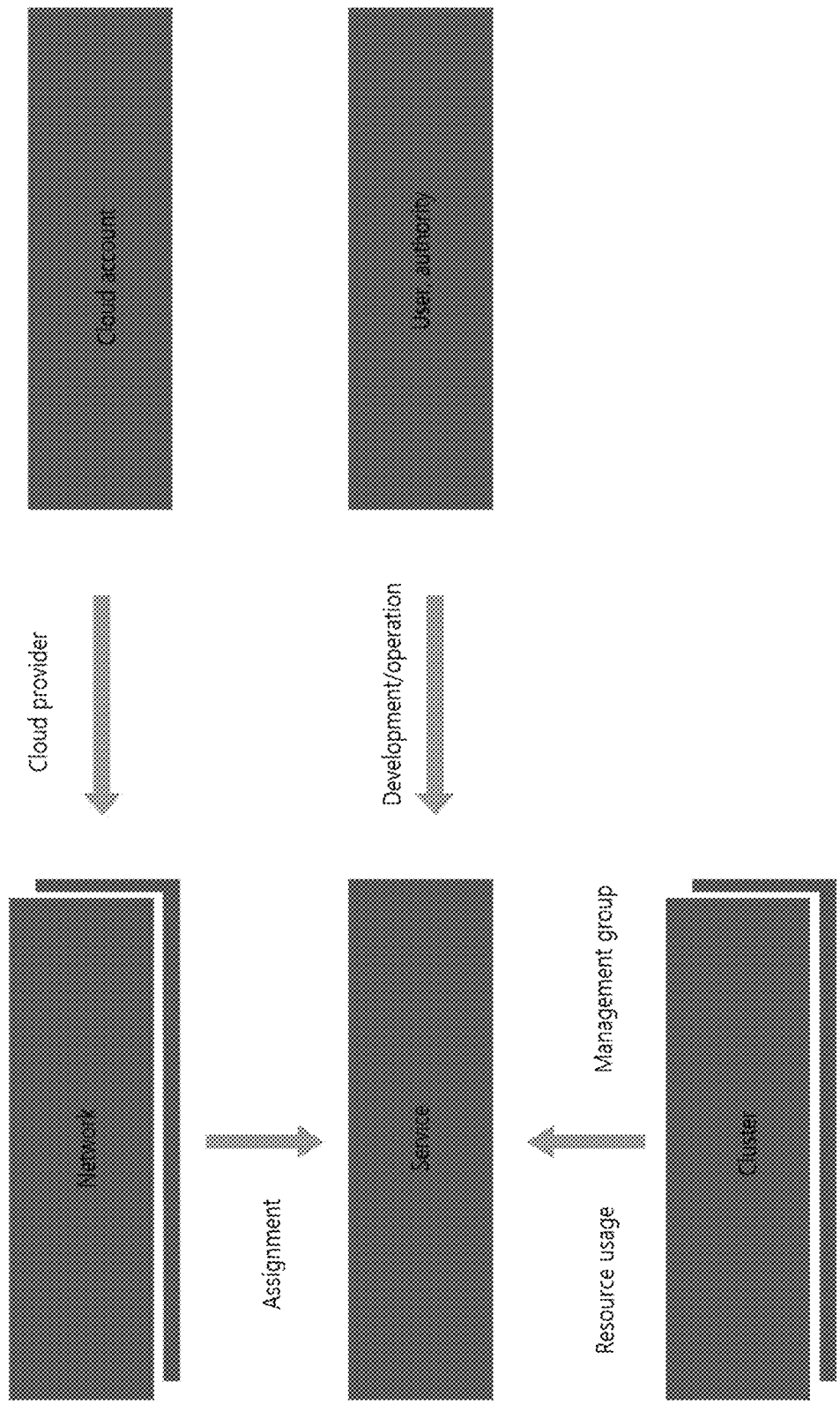
FIG. 3 illustrates briefly a function of a service management unit of FIG. 1.
Figure 4:
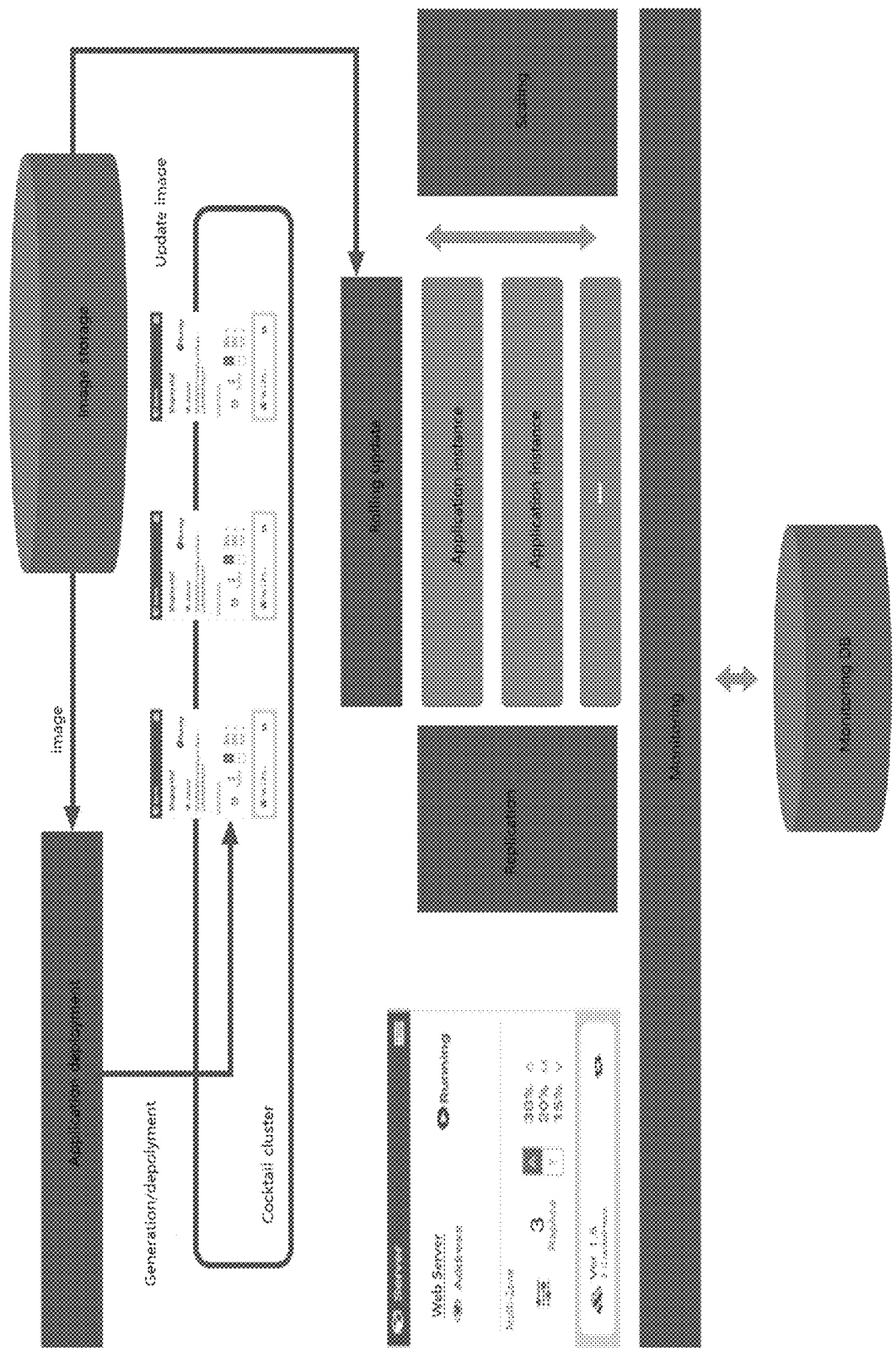
FIG. 4 illustrates briefly a function of an application orchestration unit of FIG. 1.
Figure 5:
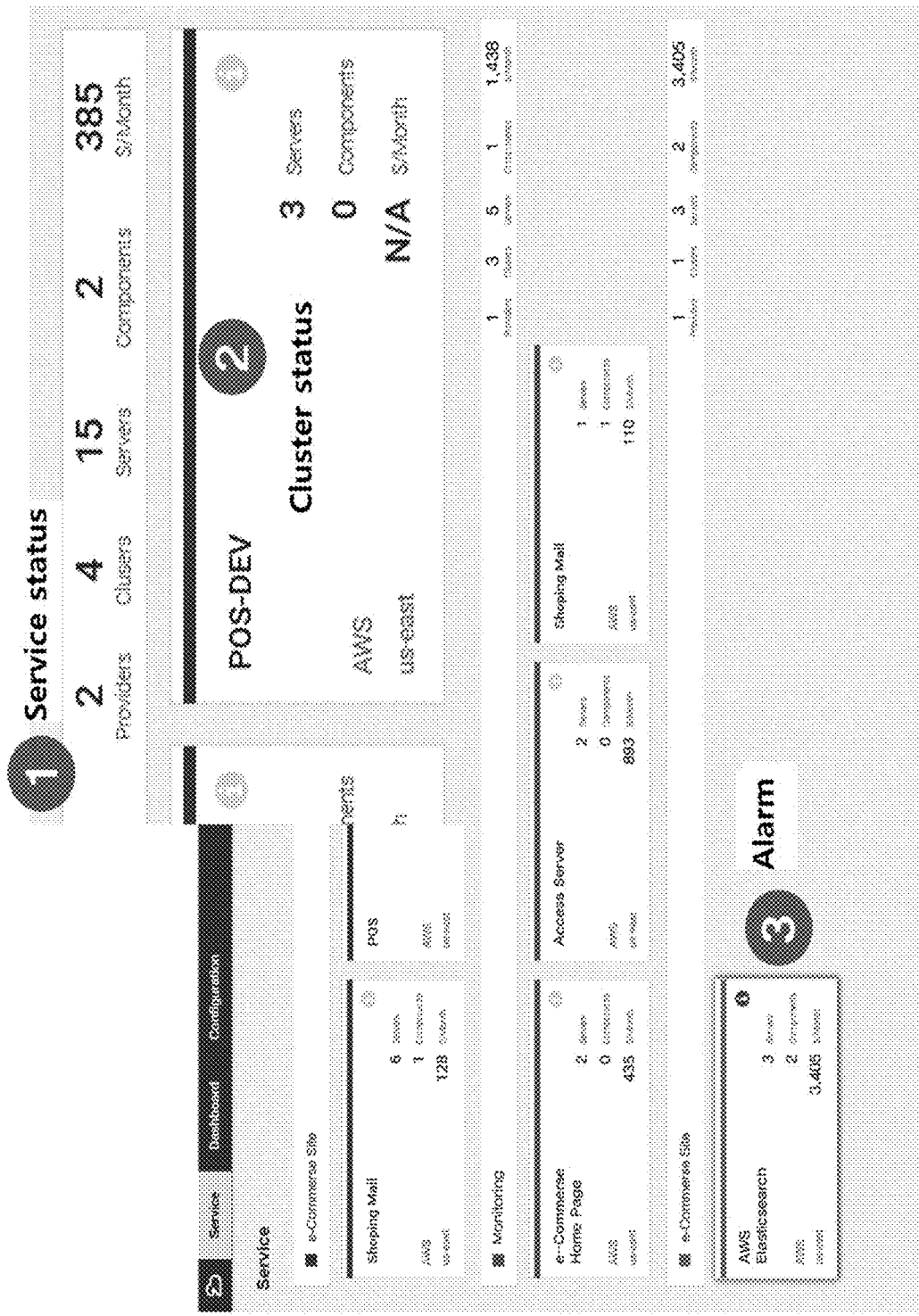
FIGS. 5 to 10 illustrate briefly functions of a development/operation unit of FIG. 1.

FIG. 1 illustrates a configuration diagram of a cloud platform system according to an embodiment of the present invention, FIG. 2 illustrates schematically a function of a cloud integration unit of FIG. 1, FIG. 3 illustrates schematically a function of a service management unit of FIG. 1, and FIG. 4 illustrates briefly a function of an application orchestration unit of FIG. 1. FIGS. 5 to 10 illustrate schematically functions of a development/operation unit of FIG. 1.

A cloud platform system of FIG. 1 provides a view and a tool for ensuring the availability and extendibility of application services and enabling efficient development and operation based on integration management of a multi/hybrid cloud. Hereinafter, a cloud platform system of the present invention is referred to as a "cocktail cloud".

Referring to FIG. 1, a cocktail cloud includes a cloud integration unit 100, a service management unit 110, an application orchestration unit 120, a development/operation unit 140 (DevOps View), and a DB/storage 150.

The cloud integration unit 100 automatically configures an infrastructure of a multi/hybrid cloud to provide the configured infrastructure to an application and synchronize configuration information for management.

The cloud integration unit 100 performs cloud provisioning and cloud synchronization functions.

Referring to FIG. 2, the cloud provisioning function is a function of configuring and providing a cloud network infrastructure to an application cluster (cocktail cluster) and configuring and providing a computing infrastructure of the cloud to the application. In addition, the cloud provisioning function provides a cluster configuration tool for a physical computer hardware infrastructure (Bare Metal). A support cloud may include AWS ("Amazon Web Service"), Azure (note, Azure is a cloud service provided by Microsoft), Aliyun (note, Aliyun is a cloud service provided by Alibaba Grup), Google Computing Engine for Public, Openstack (note, OpenStack is a free, open standard cloud computing platform. It is mostly deployed as infrastructure-as-a-service in both public and private clouds where virtual servers and other resources are made available to users), VMWare (note, VMWare herein refers to virtualization services and devices provided by VMware, Inc.) for private, and On-premise, Datacenter BareMetal (note, Baremetal herein refers to physical server dedicated to one tenant of a datacenter) Infrastructure.

The cloud synchronization function is a function of storing and managing cloud infrastructure configuration information in an integral configuration DB 160 and synchronizing infrastructure change information with the integral configuration DB 160 when the cloud is operating.

The service management unit 110 serves to assign and manage a cloud account and a user network resource to a logical group that manages an application cluster. That is, the service management unit 110 performs an integrated account management function, a network management function, and a user management function.

Referring to FIG. 3, the integrated account management (i.e., a typical functionality of a Cloud Provider) function is a function of integrally managing a multi-cloud account and access information, and the function is used for a network and a cloud providing configuration. The network management function is a function of configuring a cloud network and assigning the configured cloud network to a service such as VPC, and Subnet of AWS. One service generates a cluster using a network of a provider of a multi-cloud to configure and operate the application.

The user management function is a function of managing team members, and managing services and authority required for development/operation. Here, the authority may include enterprise service management authority (i.e., Admin), enterprise service inquiry authority (i.e., Manager), service management authority (i.e., DevOps) assigned to members, etc. It is noted that a user may participate as a member on several services.

The application orchestration unit 120 plays a key function in a cocktail cluster to ensure the deployment, availability, and extendibility of applications.

The application orchestration unit 120 performs an application deployment function, a replication control function, a rolling update function, a scaling function, and a monitoring function.

Referring to FIG. 4, the application deployment function is a function of providing convenience of not requiring a separate setting and a configuration job with container image-based deployment.

The replication control function, as a method of maintaining a specified initial replication number (multiplexing) for the reliability and availability of the application, is faster and more efficient than OS rebooting and restarting when an error occurs through an application container health check. It is noted that the replicated application is serviced through load balancing. The rolling update function is a function of performing an update job such as deployment and infrastructure change without stopping the application service, and configuring automation through a job management function of DevOps View when there are dependencies between multiple applications.

The scaling function is a function of in/out scaling of an instance through the monitoring of the application and up/down scaling of a resource capacity of the application infrastructure. In addition, scaling automation is configured through monitoring information.

The monitoring function is a function of monitoring an instance (container+infrastructure) of the application, and generating and managing an alarm through a threshold setting.

The development/operation unit (i.e., the DevOps View) 140 includes a service status function, a cluster map function, a monitoring view function, a resource management function, a metering function, a job management function, and an enterprise status management/analysis function. Each of the functions will be described below with reference to FIGS. 5 to 10. The service status function provides a view that may determine a status of a cluster of all applications of the cocktail cloud based on the service (see FIG. 5). Specifically, items of a service status, a cluster status, a monitoring alarm, etc. may be displayed on the view.

In the service status, the entire service status of the cocktail cloud is inquired and a cloud provider, a cluster, a server, a cloud component, current monthly usage cost, etc. are determined by synthesizing a configuration status of the cluster in the service. Here, the cluster means a configuration unit of the application and the service means a logical group of the cluster.

In the cluster status, a provider, a region, a server, a cloud component, and monthly usage cost may be inquired in a card form. In the case of physical (Bare Metal) cluster, the usage cost may be excluded.

In the monitoring alarm display function, when an alarm occurs in the application and/or in the infrastructure of the cluster, the cluster status may be checked in a cluster card.

Figure 6:

The cluster map function provides a view by visualizing and managing a configuration and status information of the cocktail server (application) in a map form (see FIG. 6).

The cluster map inquires/manages a configuration of a server of the cluster and a cloud component in a map form to enhance visibility of the configuration information. The cluster map may include items such as a cocktail server, a cloud component, and a server group.

The cocktail server is configured by a load balancing, an application container, and an infrastructure as a basic unit of the application orchestration, and provides an interface standardized for multi/hybrid cloud management. The cocktail server checks application status and replication and a resource usage in the server, and manages scaling, rolling update, etc. The cocktail server can be multiple instances or single instance according to a replication function. In AWS, a multi-zone option is supported.

The cloud component manages PaaS services provided by a provider. For example, the cloud component may be RDS as a DB service of AWS.

The server group provides a logical group of a server configuration to management convenience.

Figure 7:
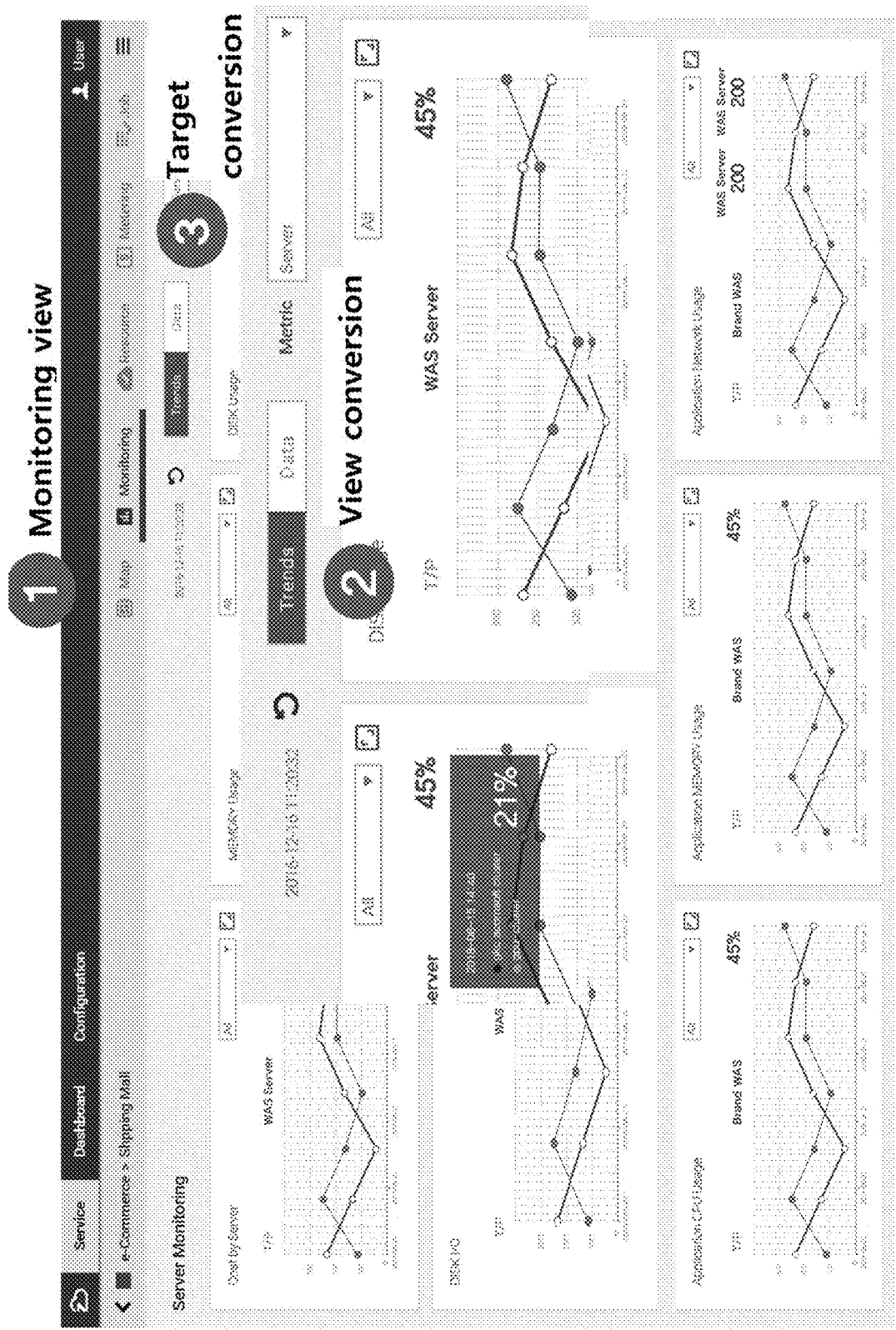

The monitoring view function provides information for checking a source capacity and a status of the application and the infrastructure in the cluster and a status of a cloud resource (see FIG. 7).

The monitoring view visualizes, provides the monitoring information on the application and infrastructure in the cluster, and checks a usage of resources by providing a CPU, a memory, an average of the disk, and TOP information to correspond to an operation.

The monitoring view may include a view conversion (trend/data) item, a target conversion (server/resource), etc.

In view conversion item, the trend view provides monitoring information frame by frame, for the server, each of the multiple application instances, and the application container, and the data view provides an average of the current time, and a TOP monitoring value.

In the target conversion item, the monitoring target can be changed to monitor a server in the cluster and a resource of the cloud infrastructure. The cloud resource uses information provided by the provider.

Figure 8:
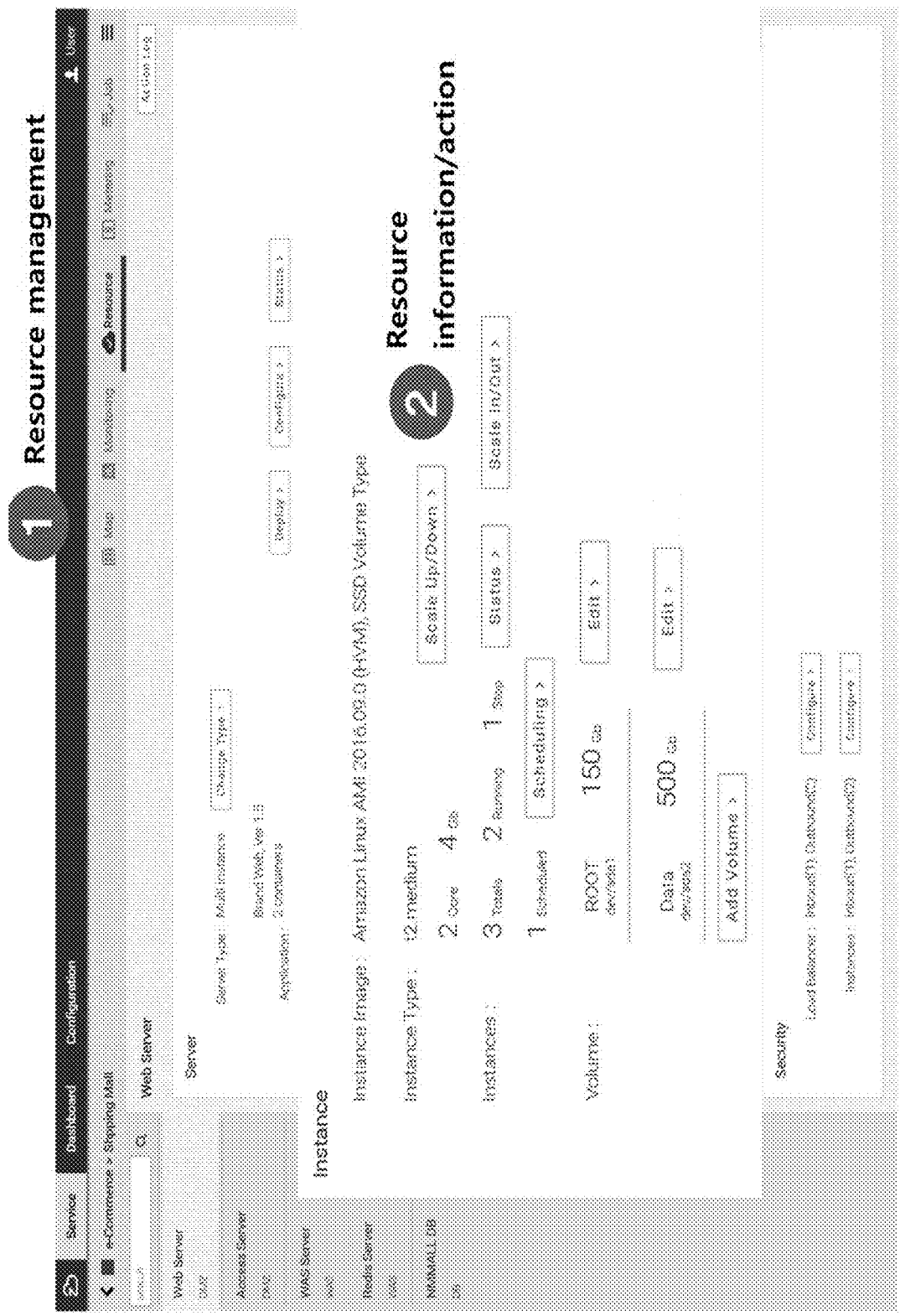

The resource management function checks a resource of the cloud infrastructure configured for the application, and provides a view (hereinafter, referred to as a "resource management view") to be used to adjust detailed settings if necessary (see FIG. 8).

The resource management view may be used to check a cloud infrastructure resource configured for the cocktail server, and change settings specifically. Here, the cocktail server automatically performs a basic configuration for the application orchestration, but the resource management view is used when there is a need for adjusting a cloud resource directly if necessary.

The resource management view includes a resource information/action item, and the applications of the resource information manage a container configuration and deployment information. The cloud resource information consists of a load balancer, an instance (which includes "instance Image", "Instance Type", "Instances", "Volume" shown in FIG. 8, a security, and the instance that manages a capacity and a volume. Resource information required for an adjustment is performed through an action.

Figure 9:
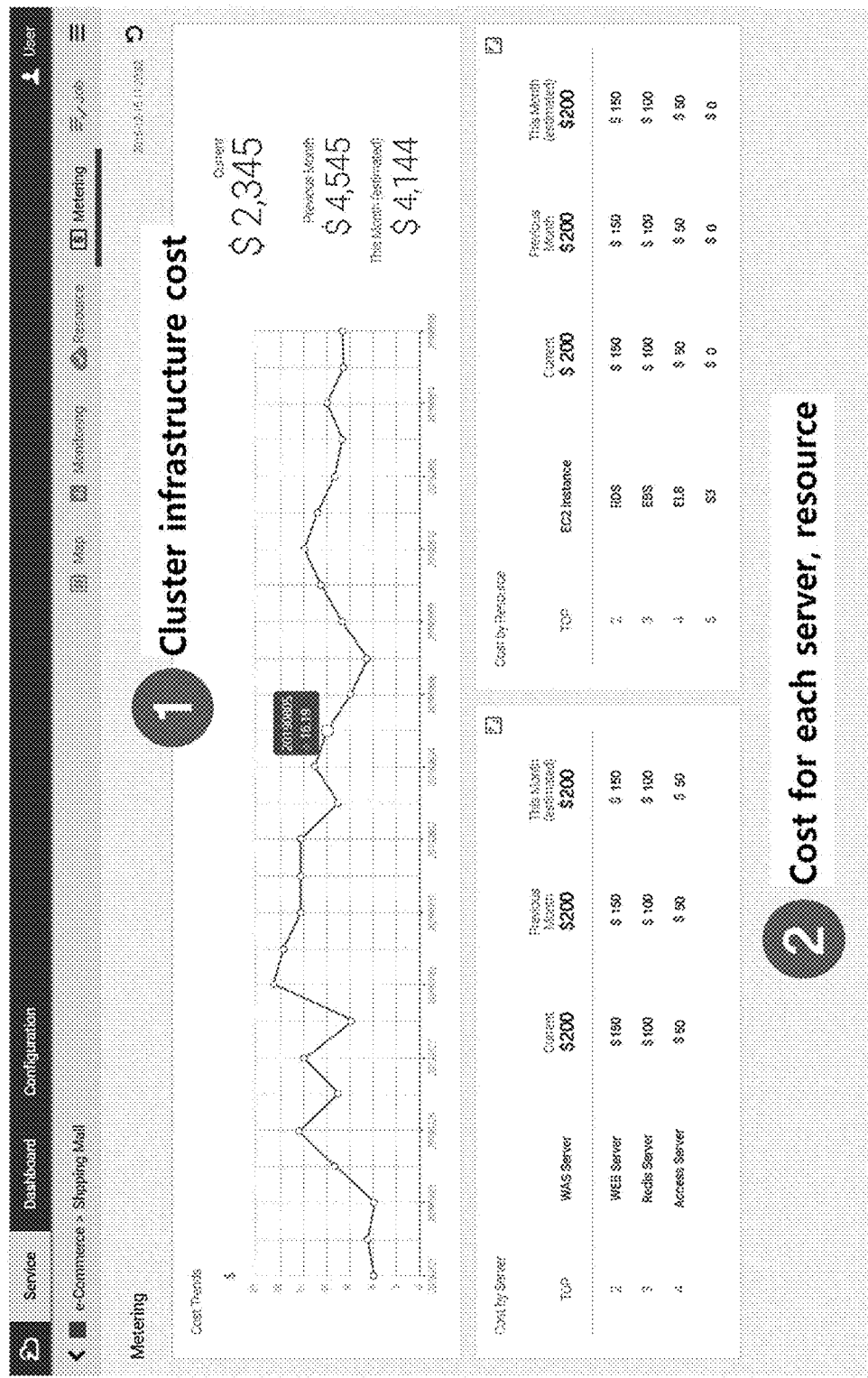

The metering function provides a view (hereinafter, referred as a "metering view") used for checking cost information of the cloud infrastructure resource that is incurred by the application (see FIG. 9). The metering view may include a cluster infrastructure use cost item, a server, a cost item for a resource, and the like.

In the cluster infrastructure use cost item, the cluster and the cocktail server may check a cost status of the using cloud resource, and provide previous month and current month cost information, and next month estimation cost. Further, a cost increase and decrease trend graph is provided for each month.

Cost items for each server and each resource provides cloud resource cost used for each cocktail server based on TOP, and provides cost used for cloud resource type based on TOP.

Figure 10:
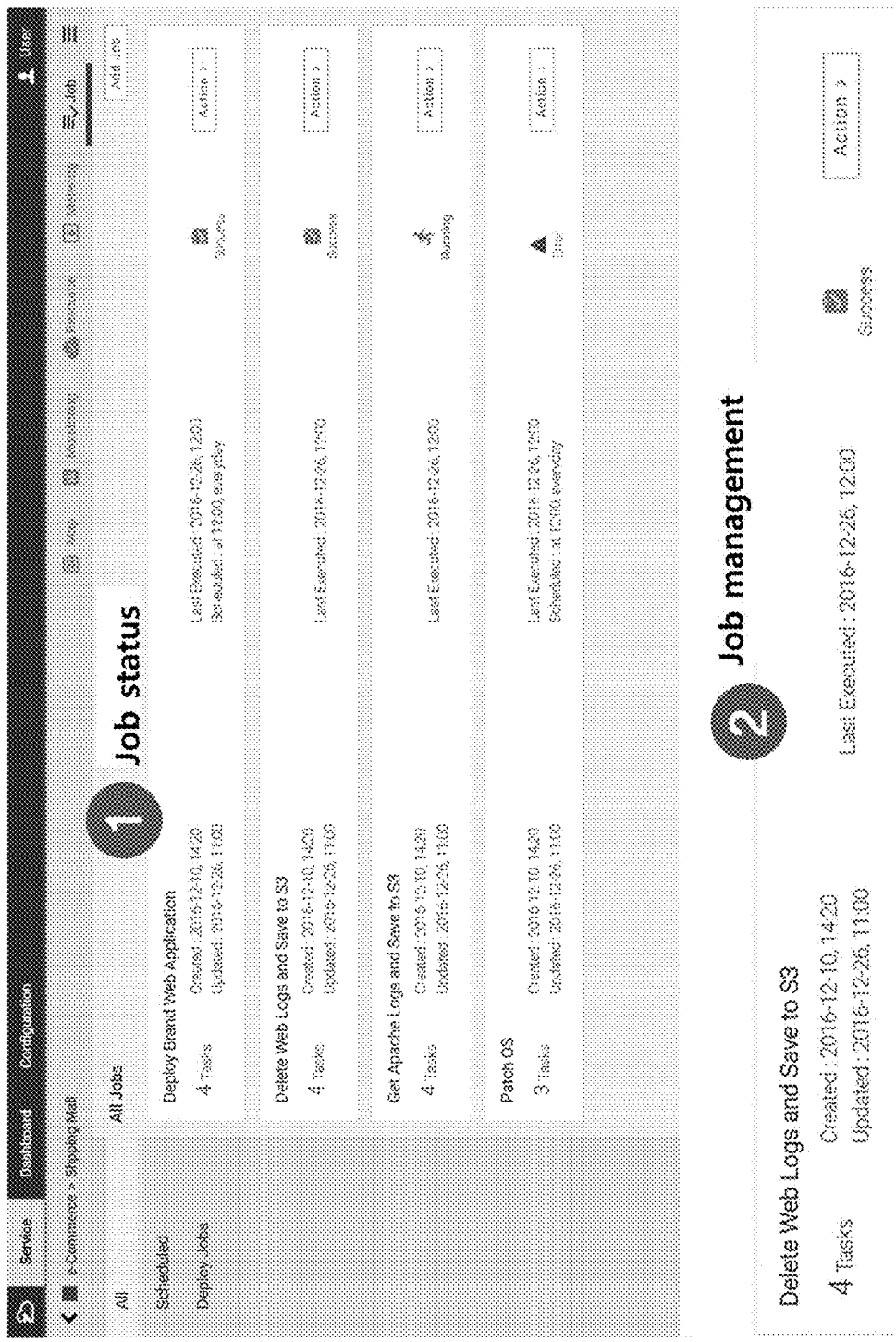

The job management function provides a management view (hereinafter referred to as an "job management view") used for scheduling/automating an operation such as deployment, a remote command, and resource management (see FIG. 10).

The job management view provides scheduling and batch-processing for operating the applications and the infrastructure. The job management view may include a job status item, a job management item, and etc.

In the job management view, the job status item is divided into three tasks: a deployment, a remote command, and a resource management task, and the job status item can be configured to show a combination of the three tasks. Here, the deployment refers to application deployment, the remote command means performing a remote OS ("Operating System") command, and the resource management means scaling and changing a status/setting.

In the job management view, the job management item may set a performing method according to immediately performing, scheduling, and occurrence of an alarm. The performance according to the occurrence of the alarm is used in automatic scaling according to a reference value of the capacity monitoring. The job management item also provides an execution state and a log check of the job.

The enterprise status management/analysis function provides a cocktail dashboard capable of that can be used to determine and analyze an enterprise application, a cloud, and a cost situation.

The cocktail dashboard is a view that is used to inquire a status of the application and the cloud infrastructure in the enterprise level, and to provide cost/budget management, cost optimization analysis, and statistics reports. The cocktail dashboard may include an application status item, a cloud status item, a cost/budget management item, a cost optimization analysis item, and a statistics/report item.

The application status item enterprise-widely determines and inquires application and infrastructure statuses based on standardized elements of the server, the cluster, and the cloud component, and provides a service-based status view.

The cloud status item determines a status of a cloud used for the enterprise on the level of each provider, each region, and each resource, and provides an infrastructure-based status.

The cost/budget management item and the cost optimization analysis items determine an enterprise cloud cost situation, and provide information that can be used to facilitate economizing cloud resource usage by budget assignment/control and optimized analysis for each service.

The statistics/report item provides statistical information and a report view for analysis and reporting.

In the DB/storage 150, an image storage (registry) 180 which manages registration, share, download, search, version of the application container, a monitoring DB 170 which manages monitoring information of the application and the infrastructure, and an integral configuration DB (configuration management DB, CMDB) 160 which manages configuration information of a provider, a network, a service, a cluster, a server, a component, and a cloud resource.

Figure 11:
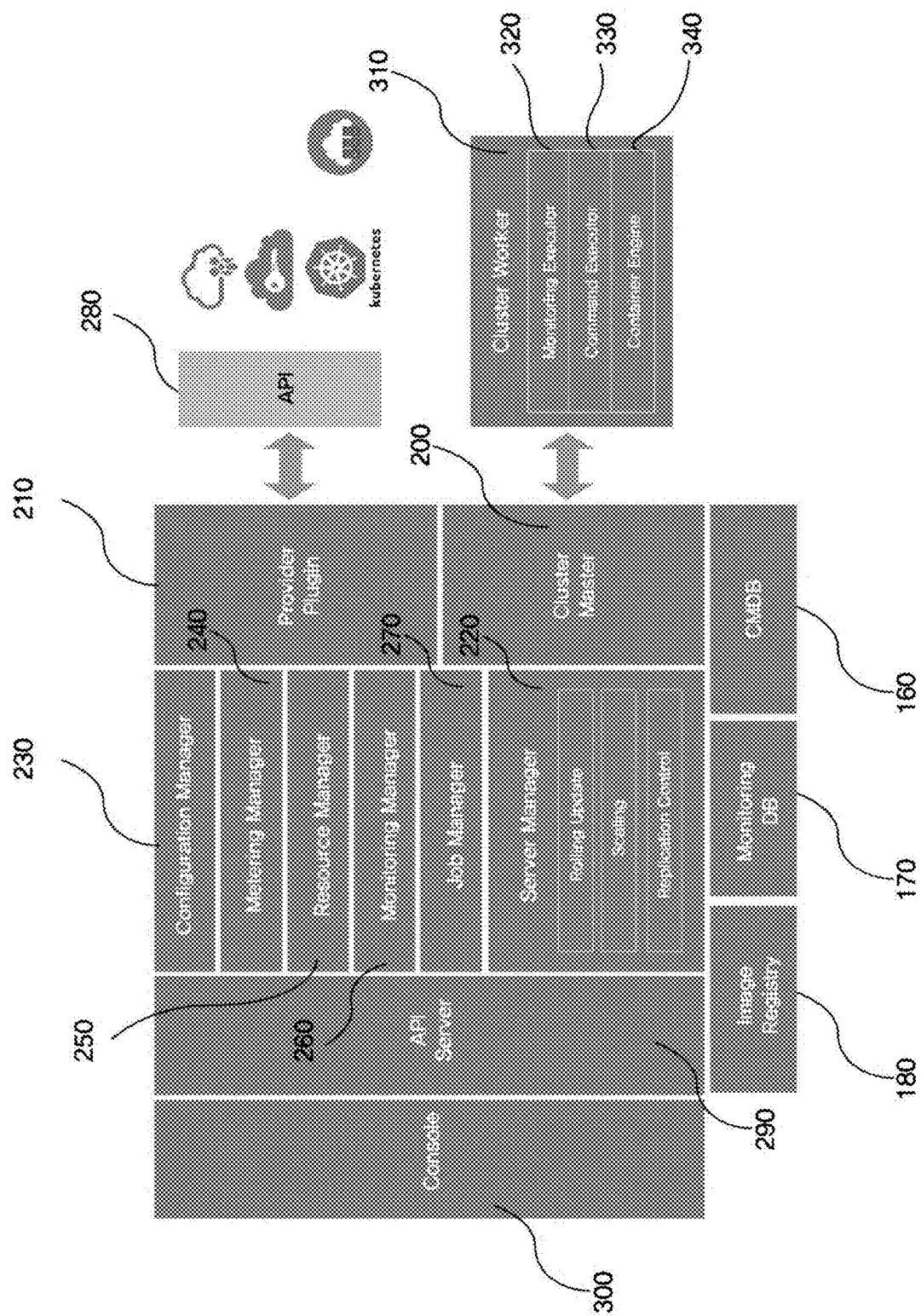
FIG. 11 illustrates an architecture of a cloud platform system according to an embodiment of the present invention.
Figure 12:
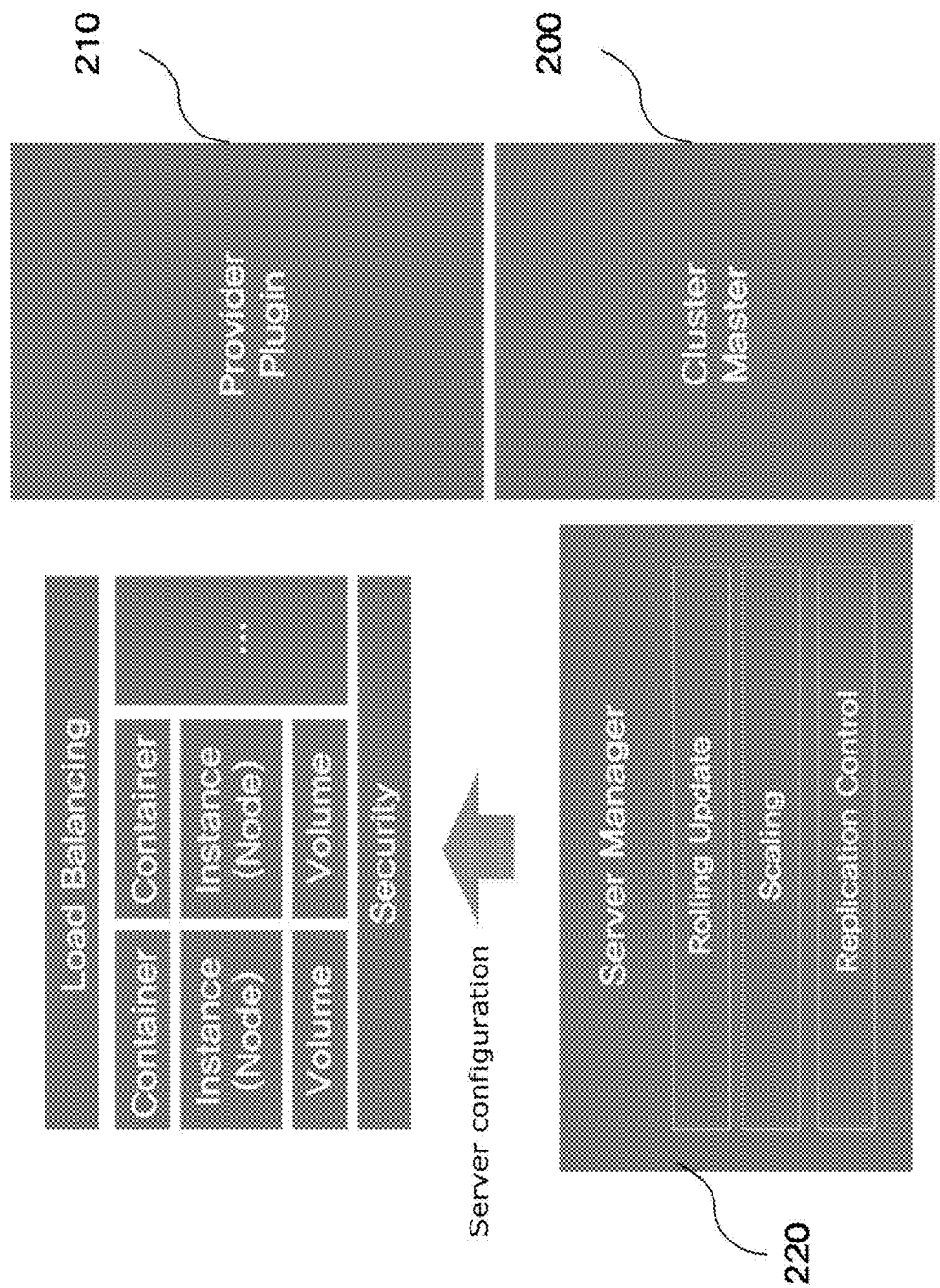
FIG. 12 illustrates a configuration of a cocktail server and surrounding architectures thereof.

FIG. 11 illustrates an architecture of a cloud platform system according to an embodiment of the present invention and FIG. 12 illustrates a configuration of a cocktail server and supporting architectures thereof.

Referring to FIG. 11, a cocktail cloud includes a cocktail cluster 200, a provider plugin 210, a server manager 220, a DevOps manager, a CMDB 160, a monitoring DB 170, an image registry 180, an API server 290, and a user console 300.

The cocktail cluster 200 provides an orchestration-based architecture, and the provider plugin 210 is used as a basic module for integral management by a cloud provider API 280.

The cluster 200 is constituted with a node and a master, and the node is a structure that processes a command of the master by a worker 310. The worker 310 is responsible for communicating with the master, and an executor is supported by an execution command. A monitoring executor 320 collects node and container monitoring information and a command executor 330 performs an OS and a container command. In addition, a container engine (docker) 340 is included.

The provider plugin 210 is an API ("Application Programming Interface") wrapper for supporting Kubernetes API for a multi-cloud and a bare metal, and is configured by a plugin module for provider extension. It is noted that Kubernetes is an open-source container orchestration system for automating software deployment, scaling, and management.

The cocktail server is a basic unit of the application orchestration, and it performs replication, scaling, and rolling update of the container and the cloud infrastructure by the cluster master 200 and the provider plugin 210.

The cocktail server is constituted with a container and a cloud infrastructure as illustrated in FIG. 12, and constituted with a load balancer, an instance (node), a container, a volume, security, and in some cases, other components such as, ELB, EC2 Instance, Security Group, and ESB of AWS. The cocktail server provides a cloud component for PaaS of the cloud provider. For example, the cocktail server may be RDS ("Relational Database Service") of AWS ("Amazon Web Service").

The server manager 220 is a control module that is used to perform an application container and orchestration of an infrastructure in the server, and provides a replication control to restart/recover a container abnormally terminated, scaling in/out and/or up/down of performance scale through an instance type and a volume extension, and a rolling update function that is used to perform, non-disruptively, a sequential deployment of an application container.

The DevOps manager, as a manager module of DevOps, provides a configuration manager 230 for provisioning a multi-cloud infrastructure, a metering manager 240 for managing a usage and cost of multi-cloud resources, a resource manager 250 for managing a resource status and settings of the multi-cloud, a monitoring manager 260 for collecting and managing container/infrastructure monitoring information, and a job manager 270 for a task of deployment, a server action, and a remote command in which various job tasks are combined and integrally performed, and immediate performance, a performance time, and event occurrence are provided as performance conditions.

The cocktail cloud provides a DB for managing configuration information of an application and an infrastructure, and monitoring information, and an application container image. The cocktail cloud also provides a user an interface for programming.

The CMDB 160 manages configuration information of a provider, a network, a service, a cluster, a server, a component, and a cloud resource.

The monitoring DB 170 manages monitoring information of the application and the infrastructure.

The image registry 180 manages registration, share, download, search, version of the application container.

The API server 290 provides all functions of the cocktail cloud to the API 280 and supports customization according to a corporate strategy and integration with other solutions.

The user console 300 is provided in a form of Web GUI ("Graphic User Interface").

The cocktail cloud may be used as follows.

First, the cocktail cloud may be used as a multi-cloud.

The cocktail cloud is a platform for integral management of a heterogeneous and complex multi-cloud environment by a standardized component, and implements the entire business cloud composition and configuration based on the nature of the application. Specifically, the cocktail cloud is a standardized management component for standardizing the managing of a target by the provider, the network, the service, the cluster, the server, and the cloud component, and integrally managing a heterogeneous and complex multi-cloud resource (integral account, resource, and cost). Furthermore, the application is a core resource of the business, and the availability and extendibility of the application are enhanced by the cocktail cluster, and the efficiency of a development/operation work is enhanced by using the cocktail DevOps View. Thereby, the implementation of a business cloud is based on the nature of the application.

Second, the cocktail cloud provides an infrastructure of construction/operation of a hybrid cloud by clouding a bare metal infrastructure in an office and a data center. The cocktail cloud also provides integral management and development/operation efficiency of a hybrid complex infrastructure. Note, a person skilled in the field of cloud computing would understand that a bare metal infrastructure refers to a physical computer hardware system.

Specifically, the application cluster is configured in the bare metal infrastructure in the office and the data center to construct a container-based cloud environment, so that a separate platform for virtualization is not required, availability and extendibility of scaling, etc., are provided, and a cloud of a physical infrastructure capable of integrally managing existing private and public clouds may be implemented. Also, the cocktail cloud is managed by a standard component of the cocktail cloud, and the cloud provides enhancement of efficient development/operation work efficiency by the cocktail cloud DevOps view.

Third, the cocktail cloud provides a platform for efficient management of the application on the cloud, and efficient management of constructing and operating a micro service through automation for the container and CI/CD ("Continuous Integration/Continuous Deploy").

The cocktail cluster provides an application deployment and management environment (cloud-native application) in a cloud infrastructure based on the container. Note, the cocktail cluster is a basic unit of constructing and managing a micro service.

Job management of the cocktail DevOps view provides an automated infrastructure capable of building and deploying the application, making the container may be lighter and easier to perform the CI/CD. The cocktail cloud also provides a platform that may be used to deploy/operate applications on a multi/hybrid cloud.

Fourth, the cloud cocktail may be used also as an infrastructure resale and service providing platform of a cloud service broker.

The public cloud constructs and operates a CSB ("Cloud Service Broker") platform which manages a data center infrastructure, provides a resale and cloud management platform to a user in a service form, provides, as a cocktail cloud, a multi-tenancy and billing system for SaaS ("Software as a Service"), and can be used as a platform for providing and managing affiliate clouds in the case of large-scale enterprises.

Also, the public cloud clouds provides an infrastructure of an existing data center provider and provides a service (cocktail cloud component (PaaS)) specified by a public cloud provider.

Meanwhile, the embodiments of the present invention may be prepared by a computer executable program and implemented by a universal digital computer which operates the program by using a computer readable recording medium.

The computer readable recording medium includes storage media such as magnetic storage media (e.g., a ROM, a floppy disk, a hard disk, and the like), optical reading media (e.g., a CD-ROM, a DVD, and the like), and a carrier wave (e.g., transmission through the Internet).

As described above, according to the cloud platform system of the present invention, it is possible to ensure the availability and extendibility of application services, enable multi/hybrid cloud integration management, and construct, operate, and manage an enterprise cloud enabling efficient development and operation.

The present disclosure has been described above with reference to preferred embodiments thereof. It is understood to those skilled in the art that the present disclosure may be implemented as a modified form without departing from an essential characteristic of the present disclosure. Therefore, the disclosed embodiments should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

The invention claimed is:

1. A cloud platform system for constructing, managing, and operating a cloud system for an application, comprising one or more physical computer hardware, and further comprising:
   a cloud integration processor which configures an infrastructure of a multi/hybrid cloud to provide the configured infrastructure to the application and synchronize configuration information for cloud management;
   a service management processor which serves to assign and manage a cloud account and a user network resource to a logical group that manages an application cluster on which the application runs;
   an application orchestration processor which deploys the application based on a container image, provides the infrastructure of the cloud when the application is deployed, replicates the application to multiple application instances, wherein the replicated application is serviced through load balancing, performs an update job including deployment and infrastructure change without stopping the load balancing, performs a rolling update configuring automation when there are dependencies between the multiple application instances, in/out scaling of one instance of the multiple application instances through the monitoring of the application and up/down scaling of a resource capacity of the application infrastructure, and configures scaling automation through monitoring information; and
   a development/operations (DevOps) processor for providing a service status function, a cluster map function, a monitoring function, a resource management function, a metering function, a job management function, and an enterprise status management/analysis function.

2. The cloud platform system of claim 1, wherein the cloud integration processor performs a cloud provisioning function of configuring and providing a network infrastructure of the cloud to a cluster of the multiple application instances and configuring and providing a computing infrastructure of the cloud to the multiple application instances, and provides a cluster configuration tool for a physical infrastructure.

3. The cloud platform system of claim 1, wherein the cloud integration processor stores and manages configuration information of the infrastructure of the cloud in an integral configuration database and synchronizes infrastructure change information with the integral configuration database when the cloud is operating.

4. The cloud platform system of claim 1, wherein the service management processor performs an integrated account management function of integrally managing a multi-cloud account and access information.

5. The cloud platform system of claim 1, wherein the service management processor performs a user management function of managing team members managing the service and authority required for development/operation, wherein the authority includes enterprise service management authority, enterprise service inquiry authority, and service management authority assigned to managing team members.

6. The cloud platform system of claim 1, wherein the application orchestration processor replicates the application to the multiple application instances while maintaining a specified initial replication number and restarts when an error occurs through an application container health check.

7. The cloud platform system of claim 1, wherein the application orchestration processor performs a monitoring function of monitoring one instance of the multiple application instances and generating and managing an alarm through a threshold setting.

8. The cloud platform system of claim 1, wherein the service status function of the development/operation processor provides a view that determines a status of the application cluster based on the service, wherein items of a service status, a cluster status, and a monitoring alarm are displayed on the view.

9. The cloud platform system of claim 8, wherein in the service status, the entire service status of the cloud is inquired and a cloud provider, a cluster, a server, a cloud component, current month using cost are determined by synthesizing a configuration status of the cluster in the service.

10. The cloud platform system of claim 8, wherein in the cluster status, a provider, a region, a server, a cloud component, and a monthly usage cost of the cluster are inquired in a card form and in the case of the physical computer hardware infrastructure cluster, the monthly usage cost is excluded.

11. The cloud platform system of claim 8, wherein in the monitoring alarm item, when an alarm occurs in the multiple application instances and the infrastructure of the cluster, the cluster status is checked in a cluster card.

12. The cloud platform system of claim 1, wherein the cluster map function of the development/operation processor provides a view by visualizing and inquiring/managing a configuration and status information of the multiple application instances in a map form, wherein items including a server of the cluster, a cloud component, and a server group are displayed on the view.

13. The cloud platform system of claim 12, wherein the server item of the cluster checks the status of the multiple application instances, replication and a resource usage in the server, manages scaling, rolling update, and is divided into multiple instances or single instance according to a replication function.

14. The cloud platform system of claim 12, wherein the cloud component item manages Platform as a Service (PaaS) services provided by a provider.

15. The cloud platform system of claim 12, wherein the server group item manages a logical group of a server configuration.

16. The cloud platform system of claim 1, wherein the monitoring function of the development/operation processor provides a monitoring view capable of checking a source capacity and a status of the multiple application instances and the infrastructure in the cluster and checking a status of a cloud resource, and wherein the monitoring view checks a usage of resources by providing a central processing unit (CPU), a memory, and an average of a disk information to correspond to an operation.

17. The cloud platform system of claim 16, wherein the monitoring view includes a view conversion item and a target conversion item,
   in the view conversion item, a trend view provides monitoring information for each time for the server, the multiple application instances, and the application container, and the data view provides an average of the current time, and a monitoring value, and
   in the target conversion item, a monitoring target is divided into a server in the cluster and a resource of the cloud infrastructure.

18. The cloud platform system of claim 1, wherein the resource management function of the development/operation processor checks a resource of the cloud infrastructure configuring the application and provides a resource management view capable of adjusting detailed settings.

19. The cloud platform system of claim 18, wherein the resource management view includes a resource information item and an action item, the resource information is applied to manages container configuration and deployment information, wherein the resource information of the cloud includes a load balancer, an instance, and a security, the instance manages a capacity and a volume, and resource information required for adjustment is performed through the action item.

20. The cloud platform system of claim 1, wherein the metering function of the development/operation processor provides a metering view capable of checking cost information of the infrastructure resource of the cloud used for the application, wherein the metering view includes a cluster infrastructure use cost item, a server, and a cost item for a resource.

21. The cloud platform system of claim 20, wherein in the cluster infrastructure use cost item, a cost status of the cloud resource used by the cluster and the server, previous month and current month cost information, next month estimation cost, and a cost increase and decrease trend graph for each month are provided.

22. The cloud platform system of claim 20, wherein cost items for each server and each resource provide cloud resource cost used for each server and provides cost used for each cloud resource type.

23. The cloud platform system of claim 1, wherein the job management function of the development/operation processor provides a job management view capable of scheduling and automating an operation job including deployment, a remote command, and resource management.

24. The cloud platform system of claim 23, wherein the job management view includes a job status item and a job management item,
   the job status item is divided into the deployment, the remote command, and the resource management task and configured by combining respective tasks, wherein the deployment refers to application deployment, the remote command means performing an Operating System (OS) command in remote, and the resource management means scaling, and a status/setting change, and
   the job management item sets a performing method according to immediately performing, scheduling, and occurrence of an alarm, wherein the performance according to the occurrence of the alarm is used in automatic scaling according to a reference value of the capacity monitoring, and in the job management item, an execution state and a log check of the job are provided.

25. The cloud platform system of claim 1, wherein the enterprise status management/analysis function of the development/operation processor provides a dashboard which inquires about a status of each of the multiple application instances and the cloud infrastructure in the enterprise level and provides cost/budget management, cost optimization analysis, and statistics reports.

26. The cloud platform system of claim 25, wherein the dashboard includes an application status item, a cloud status item, a cost/budget management item, a cost optimization analysis item, and a statistics/report item,
   the application status item enterprise-widely determines and inquires about status information of the multiple application instances and the infrastructure based on standardized elements of the server, the cluster, and the cloud component and provides a service-based status view,
   the cloud status item determines a status of the cloud used for the enterprise for each provider, each region, and each resource and provides an infrastructure-based status, and
   the statistics/report item provides statistical information and a report view required for analysis and reporting.

27. The cloud platform system of claim 1, further comprising:
   an image storage which manages registration, share, download, search, version of the application container, a monitoring database which manages monitoring information of the application and the infrastructure, and an integral configuration database which manages configuration information of a provider, a network, a service, a cluster, a server, a component, and a cloud resource.

28. A cloud platform system having an architecture, the system comprising one or more hardware processors configured to execute computer programs including:
   a cluster which is configured by a node and a master based on an orchestration, wherein the node is a structure of processing a command of the master by a worker and the worker is responsible for communication with the master and an executor is supported by an execution command;
   a provider plugin which is used as a basic module for integral management by a cloud provider application programing interface (API) and an API wrapper for supporting an API of an open-source container orchestration system for automating software deployment, scaling, and management for a multi-cloud environment and one or more physical computer hardware and is configured by a plugin module for provider extension;

a server manager which is a control module of performing orchestration of an application container and an infrastructure in the server, and provides a replication control to restart/recover a container abnormally terminated, scaling of performing scale in/out and up/down through an instance type and a volume extension, and a rolling update function of performing non-disruptively an application container deployment sequentially;

a development/operations (DevOps) manager, as a manager module of DevOps, which provides a configuration manager for provisioning a multi-cloud infrastructure, a metering manager for managing a usage and cost of multi-cloud resources, a resource manager for managing a resource status and settings of the multi-cloud, a monitoring manager for collecting and managing container/infrastructure monitoring information, and a job manager for a task of deployment, a server action, and a remote command in which various job tasks are combined and integrally performed and an immediate performance, a performance time, and event occurrence are performance conditions;

a database which is provided for managing configuration information of an application and an infrastructure, monitoring information, and an application container image;

an application programing interface (API) server which provides functions of the cloud to the API and supports customization according to a corporate strategy and integration with other solutions; and a user console provided in a form of Web graphical user interface (GUI).

* * * * *